US008968434B2

(12) United States Patent
Lecomte

(10) Patent No.: US 8,968,434 B2
(45) Date of Patent: Mar. 3, 2015

(54) FACILITY FOR PRODUCING SYNTHETIC HYDROCARBONS, AND ASSOCIATED METHOD

(75) Inventor: Michel Lecomte, Rueil Malmaison (FR)

(73) Assignee: AREVA, Paris (FR)

( * ) Notice: Subject to any disclaimer, the term of this patent is extended or adjusted under 35 U.S.C. 154(b) by 650 days.

(21) Appl. No.: 13/383,144

(22) PCT Filed: Jun. 3, 2010

(86) PCT No.: PCT/FR2010/051094
§ 371 (c)(1),
(2), (4) Date: Jan. 27, 2012

(87) PCT Pub. No.: WO2011/004088
PCT Pub. Date: Jan. 13, 2011

(65) Prior Publication Data
US 2012/0123000 A1   May 17, 2012

(30) Foreign Application Priority Data
Jul. 9, 2009   (FR) ...................................... 09 54764

(51) Int. Cl.
| C01B 3/00 | (2006.01) |
| C10J 3/46 | (2006.01) |
| C10G 2/00 | (2006.01) |
| C01B 3/12 | (2006.01) |
| C10J 3/00 | (2006.01) |
| C25B 1/04 | (2006.01) |
| C10K 1/00 | (2006.01) |
| C10K 3/02 | (2006.01) |
| C10K 3/04 | (2006.01) |

(52) U.S. Cl.
CPC ... *C10G 2/30* (2013.01); *C01B 3/12* (2013.01); *C10J 3/00* (2013.01); *C25B 1/04* (2013.01); *C10K 1/005* (2013.01); *C10K 3/026* (2013.01); *C10K 3/04* (2013.01); *C01B 2203/0283* (2013.01); *C01B 2203/062* (2013.01); *C10J 2300/1659* (2013.01); *C10J 2300/1684* (2013.01); *Y02E 60/364* (2013.01); *Y02E 60/366* (2013.01); *C10J 2300/0906* (2013.01); *C10J 2300/0909* (2013.01); *C10J 2300/0916* (2013.01); *C10J 2300/0943* (2013.01)
USPC .................................. 48/61; 423/644; 48/210

(58) Field of Classification Search
USPC ......................... 48/61, 210; 423/644; 205/742
See application file for complete search history.

(56) References Cited

FOREIGN PATENT DOCUMENTS

| EP | 2 206 762 A1 | 7/2010 |
| WO | WO 2005/019384 A1 | 3/2005 |
| WO | WO 2006/099573 A1 | 9/2006 |
| WO | WO 2007/108014 A1 | 9/2007 |
| WO | WO 2008/033812 A2 | 3/2008 |
| WO | WO 2008/044056 A2 | 4/2008 |
| WO | WO 2008/115933 A1 | 9/2008 |

*Primary Examiner* — Matthew Merkling
(74) *Attorney, Agent, or Firm* — Davidson, Davidson & Kappel, LLC

(57) ABSTRACT

An assembly for producing at least one synthetic hydrocarbon from at least one inflowing stream of carbon monoxide and one inflowing stream of carbon dioxide is provided. The assembly includes an electrolyzer provided for producing a first stream of hydrogen, a first conversion unit provided for producing an intermediate stream of carbon monoxide from at least one portion of the inflowing stream of carbon dioxide and hydrogen, a reactor for synthesizing said synthetic hydrocarbon; a second conversion unit provided for producing a second stream of hydrogen from carbon monoxide and water, the second hydrogen stream being directed towards the synthesis reactor; a guide assembly provided for selectively distributing the inflowing stream of carbon monoxide between the second conversion unit and the synthesis reactor, and for selectively distributing the first hydrogen stream between the first conversion unit and the synthesis reactor; a control unit provided for controlling the guide assembly.

11 Claims, 3 Drawing Sheets

FACILITY FOR PRODUCING SYNTHETIC HYDROCARBONS, AND ASSOCIATED METHOD

The present invention generally relates to the production of synthetic hydrocarbons from carbonaceous material.

More specifically, the invention according to a first aspect relates to an assembly for producing at least one synthetic hydrocarbon from at least an inflowing stream of carbon monoxide and an inflowing stream of carbon dioxide, the assembly comprising:
- an electrolyzer provided for producing a first stream of hydrogen from water and from electricity,
- a first conversion unit provided for producing an intermediate stream of carbon monoxide from at least a portion of the inflowing stream of carbon dioxide and from hydrogen,
- a reactor for synthesis of said synthetic hydrocarbon from at least hydrogen, from at least a portion of the inflowing stream of carbon monoxide and from the intermediate stream of carbon monoxide.

BACKGROUND

Such an assembly is known from WO 2008/033812, which describes a production assembly comprising a gasification unit, a conversion unit of the RWGS type and a reactor for synthesizing hydrocarbons. The RWGS unit is fed with hydrogen produced by electrolysis of water, the electricity coming from a non-carbonaceous source, for example a nuclear, solar or wind energy source.

Electricity sources of the solar or wind energy type provide a fluctuating electric power. In order to smooth out the operation of the production assembly, provision is made for storing liquid hydrocarbons when the available electric power is high and for producing electricity or hydrogen from the stored hydrocarbons in the opposite case.

Thus, the hydrocarbons have to be reformed when a supplement of hydrogen is required for operating the facility. Such reforming is generally carried out in a piece of equipment such as a POX unit (partial oxidization unit) of large capacity, which has a significant cost and a significant footprint.

SUMMARY OF THE INVENTION

An object of the invention is to provide a production assembly which is less heavy, and which may continue to operate even if electricity is rare.

A production assembly of the aforementioned type is provided including:
- a second conversion unit provided for producing a second stream of hydrogen from carbon monoxide and water, the second hydrogen stream being directed towards the synthesis reactor;
- a guide assembly provided for selectively distributing the inflowing stream of carbon monoxide between the second conversion unit and the synthesis reactor, and for selectively distributing the first hydrogen stream between the first conversion unit and the synthesis reactor;
- a control unit provided for controlling the guide assembly.

The production assembly may also have one or several of the features below, considered individually or according to all the technically possible combinations:
- the first conversion unit is an RWGS unit;
- the second conversion unit is a WGS unit;
- the first and second conversion units are a same reversible unit, comprising at least one conversion reactor and a set of control valves provided for operating the conversion reactor selectively as a WGS or RWGS unit;
- the first and second conversion units are two units distinct from each other;
- the electrolyzer is supplied with electricity from an electricity distribution network, the control unit is provided for:
  - evaluating an electric power available on the distribution network;
  - controlling the guide assembly according to the available electric power.
- the control unit is provided for driving the guide assembly according to the electric power between at least first and second states:
  - in the first state, corresponding to a situation where the available electric power is relatively higher, the guide assembly directs a portion of the hydrogen stream towards the first conversion unit and directs the totality of the inflowing stream of carbon monoxide towards the synthesis reactor;
  - in the second state, corresponding to a situation where the available electric power is relatively lower, the guide assembly directs the totality of the first hydrogen stream towards the synthesis reactor and directs a portion of the inflowing stream of carbon monoxide towards the second conversion unit;
- the guide assembly is provided for selectively distributing the inflowing stream of carbon dioxide between the first conversion unit and a unit for storing and/or discharging carbon dioxide, the control unit being provided so as to order the guide assembly to direct the major portion of the inflowing stream of carbon dioxide towards the first conversion unit in the first state, and to direct the major portion of the inflowing stream of carbon dioxide towards the storage and/or discharge unit in the second state.

A facility for producing at least one synthetic hydrocarbon from carbonaceous material is also provided. The facility includes:
- a unit for gasifying the carbonaceous material, producing a first gas stream comprising at least carbon monoxide and carbon dioxide;
- a unit for conditioning the gases, separating the first gas stream into an inflowing stream of carbon monoxide and an inflowing stream of carbon dioxide;
- an assembly for producing said synthetic hydrocarbon from the inflowing stream of carbon monoxide and from the inflowing stream of carbon dioxide, having the features above.

A method for producing at least one synthetic hydrocarbon from at least an inflowing stream of carbon monoxide and from an inflowing stream of carbon dioxide is provided. The method includes the following steps:
- producing a first hydrogen stream from water and electricity;
- producing an intermediate stream of carbon monoxide from at least a portion of the inflowing stream of carbon dioxide and from hydrogen, in a first conversion unit;
- synthesizing said synthetic hydrocarbon from at least hydrogen, from at least a portion of the inflowing stream of carbon monoxide and from the intermediate stream of carbon monoxide in a synthesis reactor;

producing a second hydrogen stream from carbon monoxide and water in a second conversion unit, the second hydrogen stream being directed towards the synthesis reactor;

selectively distributing the inflowing stream of carbon monoxide between the second conversion unit and the synthesis reactor and selectively distributing the first hydrogen stream between the first conversion unit and the synthesis reactor.

The method may also have one or several of the features below, considered individually or according to all technically possible combinations:

the method comprises the following steps:
evaluating an available electric power for the step for producing the first hydrogen stream;
distributing the inflowing stream of carbon monoxide between the second conversion unit and the synthesis reactor and distributing the first hydrogen stream between the first conversion unit and the synthesis reactor, according to said available electric power.
the inflowing stream of carbon monoxide and the first hydrogen stream are distributed according to the electric power according to first and second operating modes:
in the first mode, corresponding to a situation where the available electric power is relatively higher, one portion of the first hydrogen stream is directed towards the first conversion unit and the totality of the inflowing stream of carbon monoxide is directed towards the synthesis reactor;
in the second mode, corresponding to a situation where the available electric power is relatively lower, the totality of the first hydrogen stream is directed towards the synthesis reactor and a portion of the inflowing stream of carbon monoxide is directed towards the second conversion unit:
the major portion of the inflowing stream of carbon dioxide is directed towards the first conversion unit in the first mode, and the major portion of the inflowing stream of carbon dioxide is directed towards a unit for storing and/or discharging carbon dioxide in the second mode.

BRIEF DESCRIPTION OF THE DRAWINGS

Other features and advantages of the invention will become apparent from the detailed description which is given below of it, as an indication and by no means as a limitation, with reference to the appended figures wherein.

DETAILED DESCRIPTION

Figure 1:
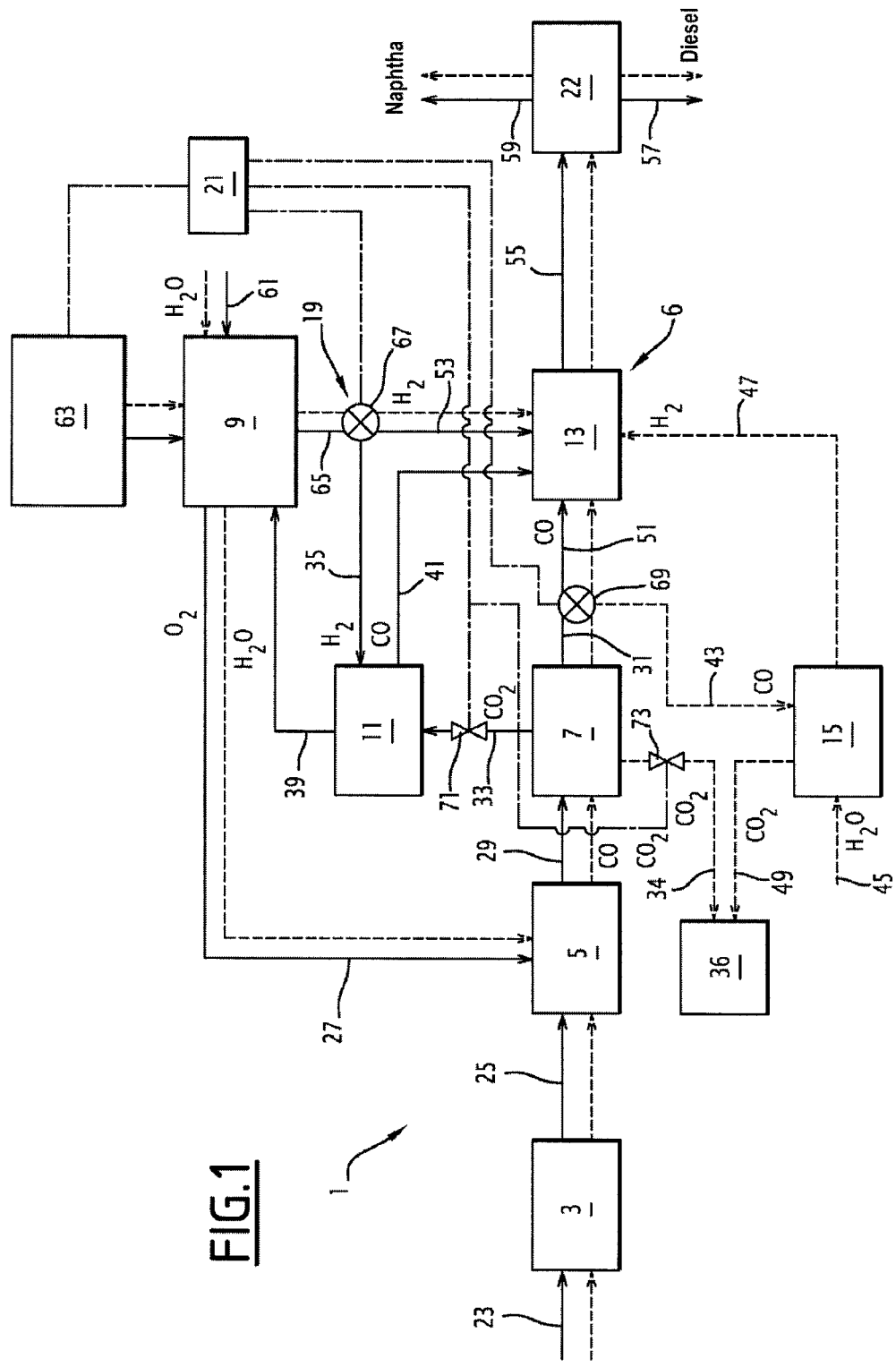
FIG. 1 is a schematic illustration of the main units of the facility for producing synthetic hydrocarbons of the invention, for a first embodiment wherein the first and second conversion units are distinct from each other.

The facility 1 illustrated in FIG. 1 is intended for producing synthetic hydrocarbons from carbonaceous material.

The carbonaceous material may comprise one or more of the following elements:
municipal waste,
animal waste,
biomass,
plastic materials such as polyethylene,
coal or coke, . . . etc.

The facility 1 comprises:
a unit 3 for pretreating the carbonaceous material;
a unit 5 for gasifying the pretreated carbonaceous material, producing a first gas stream comprising at least carbon monoxide CO and carbon dioxide $CO_2$;
an assembly 6 for producing a first stream of synthetic hydrocarbons;
a unit 7 for conditioning gases, separating the first gas stream into an inflowing stream of carbon monoxide CO and an inflowing stream of carbon dioxide $CO_2$, these flows being directed towards the production assembly 6.

In the description which follows, inflowing streams designate streams which enter the production assembly 6.

The production assembly 6 comprises:
an electrolyzer 9 producing a first hydrogen stream from water and electricity;
a first conversion unit 11 producing an intermediate stream of carbon monoxide CO from at least a portion of the inflowing stream of carbon dioxide $CO_2$ and from hydrogen;
a synthesis reactor 13 producing the first stream of synthetic hydrocarbons at least from hydrogen, from a portion of the inflowing stream of carbon monoxide CO and from the intermediate stream of carbon monoxide CO;
a second conversion unit 15 producing a second stream of hydrogen from carbon monoxide and water;
a guide assembly 19 provided for guiding certain gas streams towards the different units or reactors of the facility 1;
a control unit 21 controlling the guide assembly 19.

Moreover, the facility 1 may comprise a post-treatment unit 22 producing at least a second stream of synthetic hydrocarbons containing the sought finished products from the first stream of synthetic hydrocarbons stemming from the synthesis reactor 13.

The pretreatment unit 3 is provided in order to condition the carbonaceous material, so that it may be treated in the gasification unit 5. The pretreatment unit 3 for example achieves drying of the carbonaceous material when the latter consists of biomass. When the carbonaceous material consists of coal or coke, the pretreatment unit may for example be provided for milling the coal or the coke so as to obtain particles with a grain size adapted to gasification.

The pretreatment unit receives the carbonaceous material through line 23, and produces a pretreated carbonaceous material stream. The gasification unit 5 is for example a gasifier with partial oxidation or a steam gasifier, or a gasifier applying both combined methods (of the POS type). It is fed with pretreated carbonaceous material via line 25. It may be fed with oxygen from the electrolyzer 9 via line 27. It may also be fed with steam under pressure and at a high temperature via a line which is not illustrated in FIG. 1.

The gasifier 5 produces the first gas stream, the latter containing in majority carbon monoxide CO and carbon dioxide $CO_2$. The respective proportions of CO and $CO_2$ depend on the carbonaceous material used, and on the operating conditions of the gasifier 5. The first gas stream leaves the gasifier 5 through line 29.

The unit 7 for conditioning the gases receives the first gas stream from the gasification unit 5 and separates the latter into an inflowing stream of carbon monoxide CO and inflowing stream of carbon dioxide $CO_2$ intended to feed the production assembly 6. The inflowing stream of CO contains the major portion of the carbon monoxide CO of the first gas stream. Also, the inflowing stream of $CO_2$ contains the major portion of the carbon dioxide of the first gas stream. The unit 7 for conditioning the gases is of a known type and will not be described in detail herein. The inflowing stream of CO is directed from the gas conditioning unit 7 towards the synthesis reactor 13, and optionally towards the second conversion unit 15 through line 31.

The inflowing stream of $CO_2$ is directed from the gas conditioning unit 7 via line 33 as far as the first conversion unit 11, and/or via line 34 as far as a unit 36 provided for discharging $CO_2$ into the atmosphere and for storing $CO_2$ in any form, either gas, liquid or solid.

The first conversion unit 11 is of the RWGS type (Reverse Water Gas Shift). It is fed with $CO_2$ from the gas conditioning unit 7, via line 33. It is supplied with hydrogen from the electrolyzer 9 through line 35. In the first conversion unit, the $CO_2$ is converted into CO according to the following general chemical equation:

$$CO_2+H_2 \rightarrow CO+H_2O$$

The water is for example recycled in the electrolyzer 9 through line 39. The CO leaves the conversion unit 11 through line 41.

The second conversion unit 15 is of the WGS (Water Gas Shift) type. It is fed with CO from the gas conditioning unit, through line 43. The second conversion unit is also fed with steam through line 45.

The steam stems from the outside of the facility 1. The second conversion unit 15 is provided for producing hydrogen, by converting CO into $CO_2$, according to the following general chemical equation:

$$CO+H_2O \rightarrow H_2+CO_2$$

The hydrogen $H_2$ leaves the second conversion unit 15 through line 47. The $CO_2$ leaves the second conversion unit 15 through line 49. The $CO_2$ leaving the conversion unit 15 through line 49 is directed towards the unit 36 provided for discharging and/or storing the $CO_2$.

The synthesis reactor 13 produces a first stream of synthetic hydrocarbons, according to the Fischer-Tropsch process for example. This process is known and will not be detailed here. The reactor is fed with carbon monoxide from the gas conditioning unit 7 through line 51. The reactor is also fed with carbon monoxide CO from the first conversion unit 11 via line 41. Moreover it receives at least one portion of the first hydrogen stream from the electrolyzer 9, via line 53. It also receives the second hydrogen stream stemming from the second conversion unit 15 via line 47.

In the synthesis reactor 13, carbon monoxide and hydrogen react on catalysts, at a high temperature and form a large number of synthetic hydrocarbons. This first stream of synthetic hydrocarbons leaves the synthesis reactor 13 via line 55.

The post-treatment unit 22 produces from the first stream of synthetic hydrocarbons at least a second stream of synthetic hydrocarbons and a third stream of synthetic hydrocarbons. The post-treatment unit 22 is a refining unit of a type known per se in the oil sector. The second stream for example corresponds to the final product of the facility 1. This second stream may for example be diesel fuel, kerosene, ... etc. The third stream for example corresponds to byproducts of the post-treatment unit 22 other than the sought final product. For example it comprises naphthas or any other type of product. The naphthas may be recycled in the facility 1, as described in EP 2 206 762 A1.

The second stream of synthetic hydrocarbons leaves the post-treatment unit through line 57 and the third stream through line 59.

The second and the third streams are collected in storage tanks or may be recycled in the facility 1.

The electrolyzer 9 is of a type known per se. It is provided for producing oxygen and the first hydrogen stream, from water and electricity. The water is provided by a source outside the facility 1, via line 61. It may also stem from the first conversion unit 11 through line 39.

The electricity is provided by a local electricity distribution network 63. The network 63 is a public or private network serving a large number of consumers, in addition to the facility 1 for producing synthetic hydrocarbons. The facility 1 therefore only consumes a fraction of the electric power transported by the network 63. Accordingly, the available electric power on the distribution network 63 for the electrolyzer 9 varies over time, because the electricity consumption of the other consumers also varies. In particular, it is known that the overall electricity consumption varies during a day and is maximum in the morning and in the evening. It is lower at night and in the middle of the day. Also, the overall electricity consumption varies according to the seasons, and may be higher during winter (heating) or during summer (air conditioning). Thus, the electric power which the network 63 may make available to the electrolyzer 9 may vary during a day and/or during a year. Moreover, the cost of the electricity provided by the network 63 may also vary, this cost being generally higher during periods of strong electricity demand and lower during periods of low electricity demand.

The oxygen produced by the electrolyzer 9 is directed towards the gasification unit 5 via line 27. The first hydrogen stream leaves the electrolyzer 9 via line 65.

The guide assembly 19 includes a set of valves provided for guiding and distributing the first hydrogen stream, the inflowing stream of carbon monoxide CO and the inflowing stream of carbon dioxide $CO_2$.

More specifically, the guide assembly 19 includes a first three-way valve 67 with an inlet connected to line 65, and two outlets connected to lines 35 and 53. The three-way valve 67 is a proportional valve. It is thus provided for distributing the first hydrogen stream, from the electrolyzer 9, between the first conversion unit 11 and the synthesis reactor 13.

The guide assembly 19 includes a second three-way valve 69, with an inlet connected to line 31 and an outlet connected to lines 43 and 51. The valve 69 is a proportional valve. It is thus provided for distributing the inflowing stream of carbon monoxide from the gas conditioning unit 7, between the second conversion unit 15 and the synthesis reactor 13.

The guide assembly 19 also includes two two-way valves 71 and 73, respectively positioned on lines 33 and 34. These valves are proportional valves. They allow distribution of the inflowing stream of carbon dioxide $CO_2$ between the first conversion unit 11 and the unit 36 for storing and/or discharging carbon dioxide.

The valves, 67, 69, 71 and 73 are controlled by the control unit 21. The control unit 21 includes an evaluator for evaluating the available electric power for the electrolyzer on the distribution network 63, and a controller for controlling the guide assembly 19 according to said available electric power.

The available electric power may be evaluated by means of sensors, for example implemented on the electric station connecting the electrolyzer 9 to the network 63. Alternatively, the available electric power may be directly acquired from the manager of the network 63.

The control unit 21 for example includes a computer programmed for controlling the guide assembly 19.

The operation of the production facility 1 described above will now be detailed.

The control unit is provided for controlling the production facility 1 according to two different operating modes, the selection between both operating modes depending on the electric power available on the network 63, and/or on the needs of the facility land/or on the kilowatt/hour price rate provided by the network 63.

The first operating mode for example corresponds to a situation where the available electric power is relatively high. The circulation of the streams in this operating mode is illustrated in solid lines in FIG. 1.

The second operating mode for example corresponds to a situation where the available electric power is relatively low. The circulation of the streams in the facility 1 is illustrated in dashed lines in FIG. 1.

The switching from one operating mode to the other is decided by the operator of the production facility 1, according to technical or economic criteria. The operator may consider one or more of the following criteria:
- the available instantaneous electric power on the distribution network 63 for the electrolyzer 9,
- the available electric power on the network 63 for the electrolyzer 9 in the short or medium term,
- the cost of the kilowatt/hour charged by the network 63
- the production plan of the facility 1, and notably the production capacity objective at the current instant, in the short and medium term.

The switching between both operating modes may be manually controlled by an operator, or it may be achieved automatically on the basis of a decision algorithm implemented in a computer.

The first operating mode of the facility 1 corresponds to a first state of the guide assembly 19. In this first state, the three-way valve 67 directs a portion of the first hydrogen stream towards the first conversion unit 11, and the remainder of the first hydrogen stream towards the synthesis reactor 13. The three-way valve 69 directs the totality of the CO inflowing stream towards the synthesis reactor 13. Moreover, the two-way valves 71 and 73 are controlled so that at least a portion of the first $CO_2$ inflowing stream is directed towards the first conversion unit 11.

In this first operating mode, the first conversion unit 11 is operating and the second conversion unit 15 is off. Thus, it is possible to benefit from the fact that the available electric power is relatively high for operating the electrolyzer 9 at large capacity and produce a large amount of hydrogen. A portion of this hydrogen is used for converting a fraction of the first $CO_2$ inflowing stream into CO. The produced total amount of synthetic hydrocarbons is thereby increased.

The second operating mode of the facility 1 corresponds to a second state of the guide assembly 19. In this second state, the first three-way valve 67 directs the totality of the first hydrogen stream towards the synthesis reactor 13. The second three-way valve 69 directs a portion of the carbon monoxide CO inflowing stream towards the synthesis reactor 13, and the remainder of the first carbon monoxide stream towards the second conversion unit 15. The two-way valve 71 is closed, and the two-way valve 73 is open, the totality of the second carbon dioxide $CO_2$ stream being directed towards the storage or discharge unit 36.

In this second operating mode, the first conversion unit 11 is off and the second conversion unit 15 is operating. Because the available electric power is relatively lower than in the first operating mode, the electrolyzer 9 operates at a lower capacity and the thereby produced amount of hydrogen is reduced. In order to compensate for this reduction in hydrogen available for the synthesis of synthetic hydrocarbons, a portion of the carbon monoxide inflowing stream is converted into $CO_2$ in the second conversion unit 15, which allows production of additional hydrogen, used in the synthesis reactor 13 as an addition to the hydrogen provided by the electrolyzer 9.

A second embodiment of the invention will now be described with reference to FIGS. 2 and 3.

Only the points by which the second embodiment differs from the first will be detailed below. Identical elements and/or ensuring the same function in both embodiments will be designated by the same references.

Figure 2:
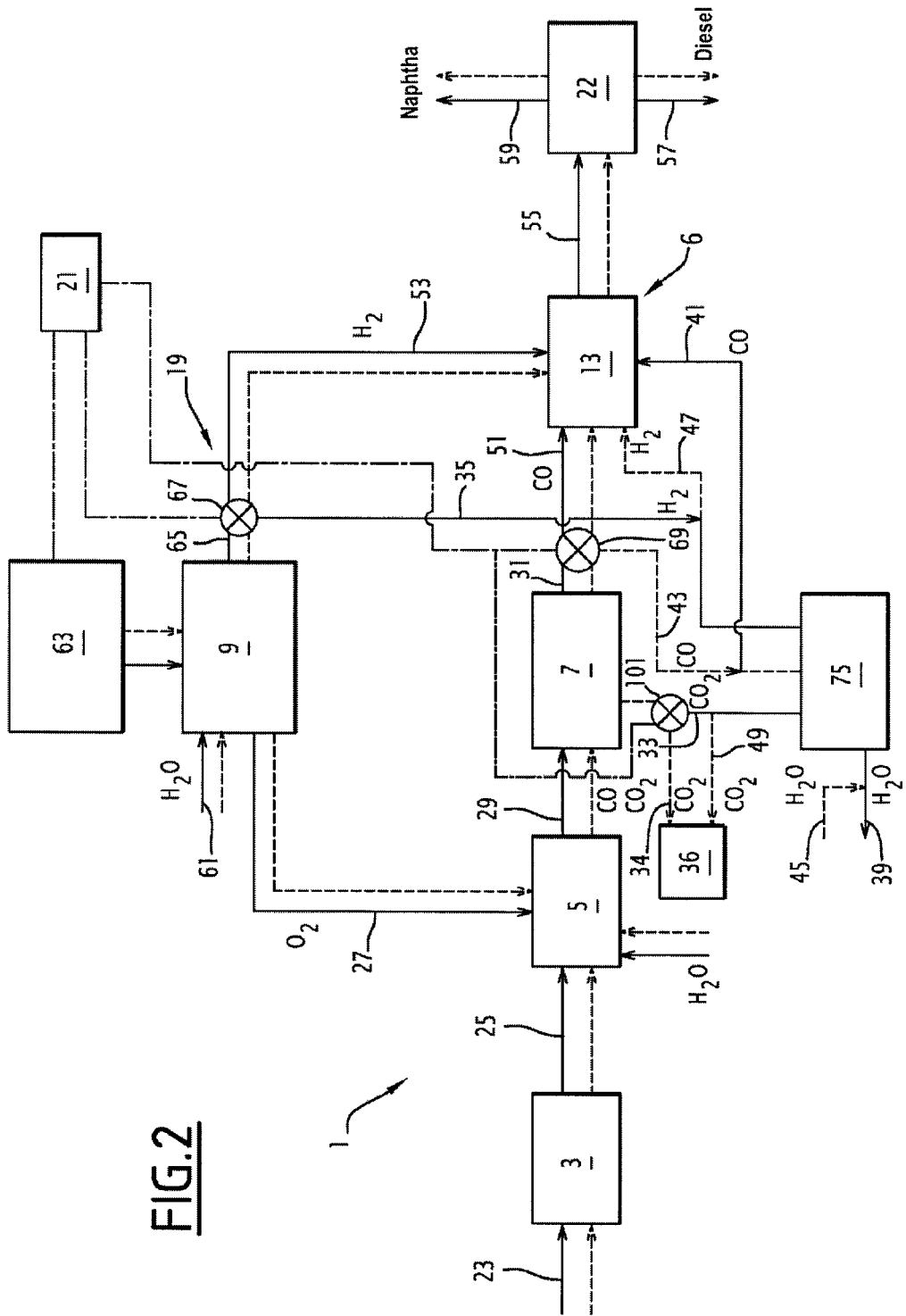
FIG. 2 is a schematic illustration similar to that of FIG. 1, for a second embodiment of the invention wherein the first and second conversion units are a same reversible conversion unit.
Figure 3:
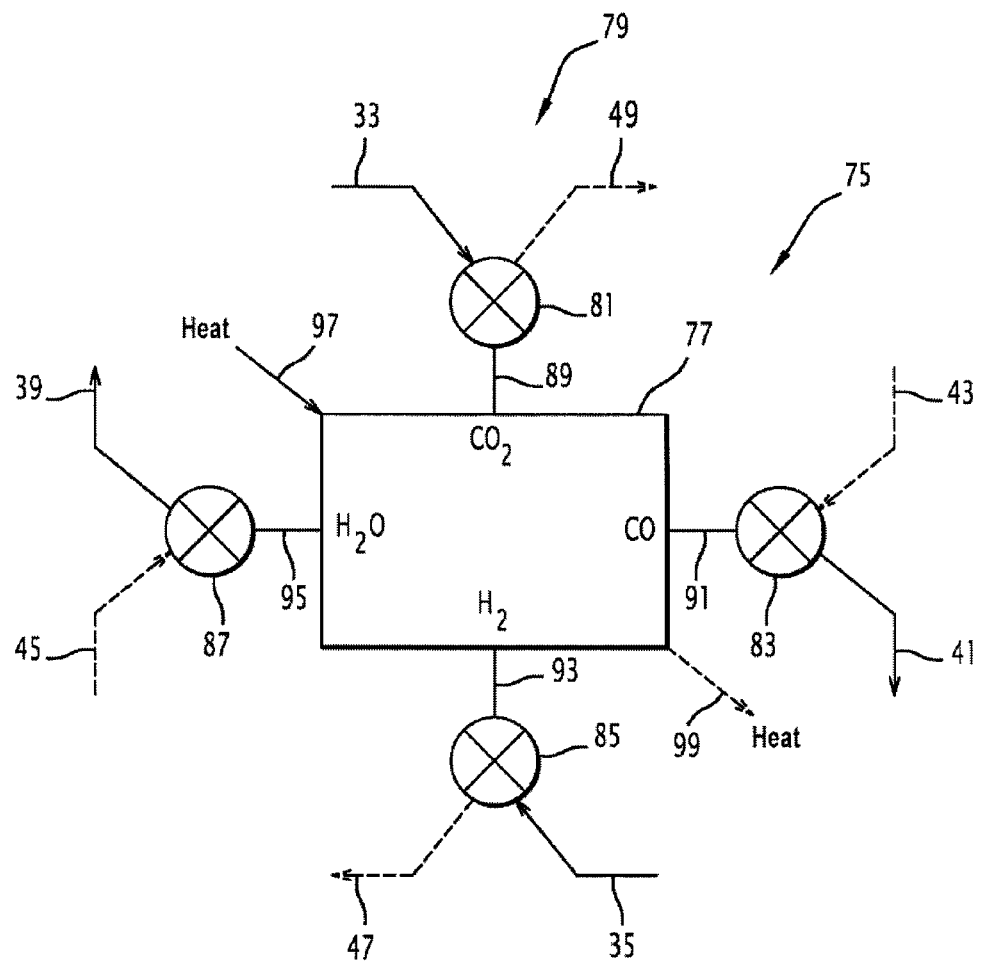
FIG. 3 is a schematic illustration of the reversible conversion unit with its set of valves.

As shown in FIG. 2, in the second embodiment, the first conversion unit 11 and the second conversion unit 15 are replaced with a single unit 75 which may operate reversibly. More specifically, the reversible unit 75 includes a conversion reactor 77 and a set of controlled valves 79 provided for selectively operating the conversion reactor 77 in the WGS or RWGS mode (see FIG. 3). Indeed, the reaction $CO_2 + H_2 \leftrightarrows CO + H_2O$ is a reversible reaction, the equilibrium being displaced on one side or the other depending on the operating conditions in the reactor 77. Thus, the same reactor may ensure either a WGS reaction or a RWGS reaction, with the same catalyst, according to the temperature, pressure conditions and according to the concentrations of the different chemical species in the reactor.

The set of valves 79 includes 4 three-way valves, each allowing admission or discharge of a fluid towards/from the reactor 77. The valves 81, 83, 85 and 87 respectively control the circulation of carbon dioxide, carbon monoxide, hydrogen and steam. These valves are controlled by the control unit 21.

The valve 81 includes an inlet connected to line 33, an outlet connected to line 49 and a third orifice connected to the reactor 77 via line 89. This third orifice is either an inlet or an outlet depending on the operating mode of the facility 1. The line 33 is connected to the gas conditioning unit 7. The line 49 is connected to the unit 36 for storage and/or discharge of $CO_2$.

The valve 83 has an inlet connected to line 43, an outlet connected to line 41 and a third orifice connected to the reactor via a line 91. This third orifice is either an inlet or an outlet depending on the operating mode of the facility 1. The line 43 is connected to an outlet of the three-way valve 69. The line 41 is connected to the synthesis reactor 13.

The three-way valve 85 has an inlet connected to line 35 and an outlet connected to line 47. It has a third orifice connected to the reactor 77 through a line 93. This orifice is either an inlet or an outlet depending on the operating mode of the facility 1. The line 35 is connected to an outlet of the three-way valve 67. The line 47 is connected to the synthesis reactor 13.

Finally the three-way valve 87 has an inlet connected to line 45 and an outlet connected to line 39. It has a third orifice connected to the reactor 77 through a line 95, and corresponds to an inlet or outlet depending on the operating mode of the facility 1. The line 45 is connected to a steam supply network. The line 39 is connected to the electrolyzer 9.

Moreover, the reactor 77 is equipped with a heating circuit 97 and a cooling circuit 99.

In the first operating mode of the facility 1, corresponding to the situation where the available electric power is relatively high, the reactor 77 operates as a RWGS unit. The three-way valve 81 has the line 33 communicate with the reactor 77 and isolates the line 49 of said reactor 77. The valve 83 has the reactor 77 communicate with line 41, and isolates the reactor from line 43. The valve 85 has the line 35 communicate with the reactor and isolates the latter from the line 47. Finally, the valve 87 has the reactor communicate with the line 39 and isolates the reactor from the line 45. Moreover, the heating circuit 97 is operating, the cooling circuit 99 being off. In this state, the reversible unit 75 ensures the same function as the first conversion unit 11 of the first embodiment.

In the second operating mode, corresponding to the situation where the available electric power is lower, the three-way valve 81 has the reactor 77 communicate with line 49 and isolates the latter from line 33. The three-way valve 83 has the reactor 77 communicate with line 43 and isolates the latter from line 41. The three-way valve 85 has the reactor communicate with line 47 and isolates line 35 from the reactor. The three-way valve 87 has the line 45 communicate with the reactor and isolates the latter from line 39. Moreover, the cooling circuit 99 is operating, the heating circuit 97 being off. In this operating mode, the reversible unit 75 plays the same role as the second conversion unit 15 of the first embodiment.

The facility 1 described above has multiple advantages.

Because it includes two conversion units 11, 15, one provided for producing carbon monoxide from carbon dioxide and hydrogen and the other one for producing hydrogen from carbon monoxide and water, the facility 1 may operate in a flexible way, its operating mode being able to be adapted according to the available electric power for the electrolyzer 9. In particular the second conversion unit 15 gives the possibility of providing additional hydrogen when the available electric power for the electrolyzer 9 is low.

The cost and the footprint of the second conversion unit 15 are clearly lower than those of a conventional reforming unit.

This is particularly true when the first and second conversion units are combined into a reversible unit 75 which may operate either as a WGS unit or as a RWGS unit.

The facility 1 may partly withdraw with respect to the electric distribution network 63 easily and rapidly, which is particularly advantageous for the manager of this network 63.

The facility 1 described above may have multiple alternatives.

Thus, the means for providing the CO inflowing stream and the $CO_2$ inflowing stream may be of any type. These means are not necessarily a gasification unit. In particular, the CO and $CO_2$ inflowing streams may stem from industrial fumes. In this case, it is not necessary to provide a gasification unit in the facility 1.

Moreover, the facility 1 may not include any post-treatment unit, the final product being directly obtained in the synthesis reactor. This post-treatment may also be carried out in another facility, the synthetic hydrocarbons leaving the synthesis reactor 13 being transported as far as this other facility.

As described above, the control of the facility 1 may be carried out in multiple ways and the switching between the different operating modes of the facility 1 may be carried out on multiple economic or technical criteria.

The synthesis reactor 13 may not operate according to the Fischer Tropsch process, but according to another process for synthesizing hydrocarbons, for example the process known under the acronym MTG (methanol to gasoline).

In this second embodiment, the two two-way valves 71 and 73 inserted in the lines 33 and 34 transporting $CO_2$ from the gas conditioning unit 7 have been replaced with a three-way valve 101. In both embodiments, each three-way valve may equally be substituted with two two-way valves and vice versa.

The invention claimed is:

1. An assembly for producing at least one synthetic hydrocarbon from at least a carbon monoxide inflowing stream and from a carbon dioxide inflowing stream, the assembly comprising:
   an electrolyzer provided for producing a first hydrogen stream from water and electricity;
   a first conversion unit provided for producing an intermediate carbon monoxide stream from at least a portion of the carbon dioxide inflowing stream and from hydrogen;
   a synthesis reactor for synthesizing the synthetic hydrocarbon from at least hydrogen, from at least a portion of the carbon monoxide inflowing stream and from the intermediate carbon monoxide stream;
   a second conversion unit provided for producing a second hydrogen stream from carbon monoxide and water, the second hydrogen stream being directed towards the synthesis reactor;
   a guide assembly provided for selectively distributing the carbon monoxide inflowing stream between the second conversion unit and the synthesis reactor, and for selectively distributing the first hydrogen stream between the first conversion unit and the synthesis reactor; and
   a control unit provided for controlling the guide assembly wherein the first conversation unit is an RWGS unit and the second conversation unit is a WGS unit.

2. The assembly as recited in claim 1 wherein the first and second conversion units are a same reversible unit comprising at least one conversion reactor and a set of control valves provided for selectively operating the conversion reactor as a WGS or RWGS unit.

3. The assembly as recited in claim 1 wherein the first and second conversion units are two units distinct from each other.

4. The assembly as recited in claim 1 wherein the electrolyzer is supplied with electricity from an electricity distribution network, the control unit being provided for evaluating an available electric power on the distribution network and controlling the guide assembly according to the available electric power.

5. The assembly as recited in claim 4 wherein the control unit controls the guide assembly according to the electric power between at least first and second states,
   the first state corresponding to a situation where the available electric power is relatively higher, in the first state the guide assembly directing a portion of the first hydrogen stream towards the first conversion unit and directing the totality of the carbon monoxide inflowing stream towards the synthesis reactor,
   the second state corresponding to a situation where the available electric power is relatively lower, in the second state the guide assembly directing the totality of the first hydrogen stream towards the synthesis reactor and directing a portion of the carbon monoxide inflowing stream towards the second conversion unit.

6. The assembly as recited in claim 5 wherein the guide assembly selectively distributes the carbon dioxide inflowing stream between the first conversion unit and a unit for storing and/or discharging carbon dioxide, the control unit ordering the guide assembly to direct a major portion of the carbon dioxide inflowing stream towards the first conversion unit in the first state, and to direct the major portion of the carbon dioxide inflowing stream towards the storage and/or discharge unit in the second state.

7. A facility for producing at least one synthetic hydrocarbon from a carbonaceous material, the facility comprising:

a gasifying unit for gasifying the carbonaceous material, the gasifying unit producing a first gas stream comprising at least carbon monoxide and carbon dioxide;

a gas conditioning unit separating the first gas stream into a carbon monoxide inflowing stream and a carbon dioxide inflowing stream; and the assembly recited in claim 1, the assembly producing the synthetic hydrocarbon from the carbon monoxide inflowing stream and from the carbon dioxide inflowing stream.

8. A method for producing at least one synthetic hydrocarbon from at least a carbon monoxide inflowing stream and a carbon dioxide inflowing stream, the method comprising:

producing a first hydrogen stream from water and electricity;

producing an intermediate carbon monoxide stream from at least a portion of the carbon dioxide inflowing stream and from hydrogen, in a first conversion unit;

synthesizing the synthetic hydrocarbon from at least hydrogen, from at least a portion of the carbon monoxide inflowing stream and from the intermediate carbon monoxide stream, in a synthesis reactor;

producing a second hydrogen stream from carbon monoxide and water in a second conversion unit, the second hydrogen stream being directed towards the synthesis reactor; and selectively distributing the carbon monoxide inflowing stream between the second conversion unit and the synthesis reactor, and selectively distributing the first hydrogen stream between the first conversion unit and the synthesis reactor.

9. The method recited in claim 8 further comprising:

evaluating an available electric power for the step for producing the first hydrogen stream;

distributing the carbon monoxide inflowing stream between the second conversion unit and the synthesis reactor, and distributing the first hydrogen stream between the first conversion unit and the synthesis reactor, according to the available electric power.

10. The method recited in claim 9 wherein the carbon monoxide inflowing stream and the first hydrogen stream are distributed according to the electric power in accordance with the first and second operating modes, the first mode corresponding to a situation where the available electric power is relatively higher, in the first mode a portion of the first hydrogen stream is directed towards the first conversion unit and the totality of the carbon monoxide inflowing stream is directed towards the synthesis reactor, the second mode corresponding to a situation where the available electric power is relatively lower, in the second mode the totality of the first hydrogen stream is directed towards the synthesis reactor and a portion of the carbon monoxide inflowing stream is directed towards the second conversion unit.

11. The method recited in claim 10 wherein the major portion of the carbon dioxide inflowing stream is directed towards the first conversion unit in the first mode, and the major portion of the carbon dioxide inflowing stream is directed towards a unit for storing and/or discharging carbon dioxide in the second mode.

\* \* \* \* \*